(12) United States Patent
Wu et al.

(10) Patent No.: US 10,381,819 B2
(45) Date of Patent: Aug. 13, 2019

(54) DC CIRCUIT BREAKER COMBINING MAGNETIC INDUCTION TRANSFER AND RESISTANCE CURRENT LIMITING

(71) Applicant: XI'AN JIAOTONG UNIVERSITY, Xi'an, Shaanxi (CN)

(72) Inventors: Yifei Wu, Xi'an (CN); Mingzhe Rong, Xi'an (CN); Fei Yang, Xi'an (CN); Yi Wu, Xi'an (CN); Chunping Niu, Xi'an (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 292 days.

(21) Appl. No.: 15/494,166

(22) Filed: Apr. 21, 2017

(65) Prior Publication Data

US 2018/0138689 A1     May 17, 2018

(30) Foreign Application Priority Data

Nov. 11, 2016 (CN) .......................... 2016 1 1005311

(51) Int. Cl.
    *H02H 3/087*     (2006.01)
    *H01H 9/54*     (2006.01)
    (Continued)

(52) U.S. Cl.
    CPC ............ *H02H 3/087* (2013.01); *H01H 9/542* (2013.01); *H01H 9/548* (2013.01); *H01H 33/14* (2013.01);
    (Continued)

(58) Field of Classification Search
    USPC ....................................................... 361/2–13
    See application file for complete search history.

(56) References Cited

U.S. PATENT DOCUMENTS

| 2012/0032762 A1* | 2/2012 | Lescale ............... H01H 33/596 335/11 |
| 2015/0222111 A1* | 8/2015 | Magnusson ............ H01H 9/542 361/91.5 |

FOREIGN PATENT DOCUMENTS

| CN | 103337851 A | 10/2013 |
| CN | 104242229 A | 12/2014 |
| CN | 105356435 A | 2/2016 |

OTHER PUBLICATIONS

Office Action from SIPO for Chinese Patent Application No. 201611005311.2.

* cited by examiner

*Primary Examiner* — Danny Nguyen
(74) *Attorney, Agent, or Firm* — Dragon Sun Law Firm, PC; Jinggao Li, Esq.

(57) ABSTRACT

The present invention provides a DC circuit breaker combining magnetic induction transfer and resistance current limiting, the circuit breaker comprising: a main current circuit, a current-limiting branch, a breaking branch, and an energy dissipation branch; the current-limiting branch and the breaking circuit each comprises a magnetic induction transfer module; an inductor in the magnetic induction transfer module of the current-limiting branch and a branch inductor in the current-limiting branch are coupled to form a mutual inductor; an inductor in the magnetic induction transfer module of the breaking branch and a second inductor in the transfer current loop are coupled to form a mutual inductor. The present invention can limit the current rising speed and amplitude and completely turned off the short-circuit current, thereby reducing the size and manufacturing cost of the circuit breaker. The main loop capacitance needs not be pre-charged; isolation between a secondary charging circuit and the main loop is realized; the discharging capaci- (Continued)

tance of the magnetic induction transfer modules adopt a bridge structure, which may two-way limit and break the fault current.

7 Claims, 16 Drawing Sheets

(51) Int. Cl.
*H01H 33/14* (2006.01)
*H01H 33/59* (2006.01)
(52) U.S. Cl.
CPC ..... *H01H 33/596* (2013.01); *H01H 2009/543* (2013.01); *H01H 2009/544* (2013.01)

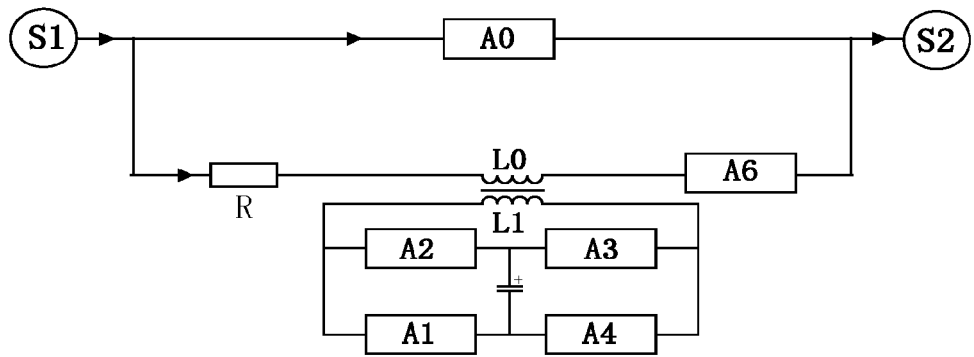
Fig.5（b）
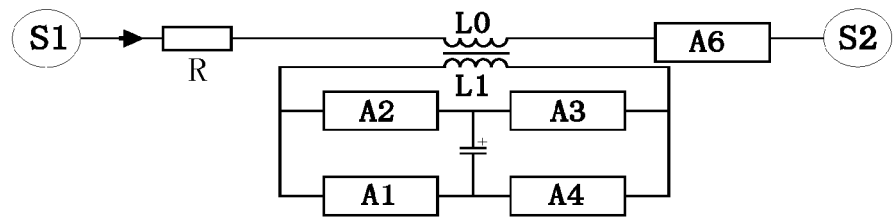
Fig.5（c）
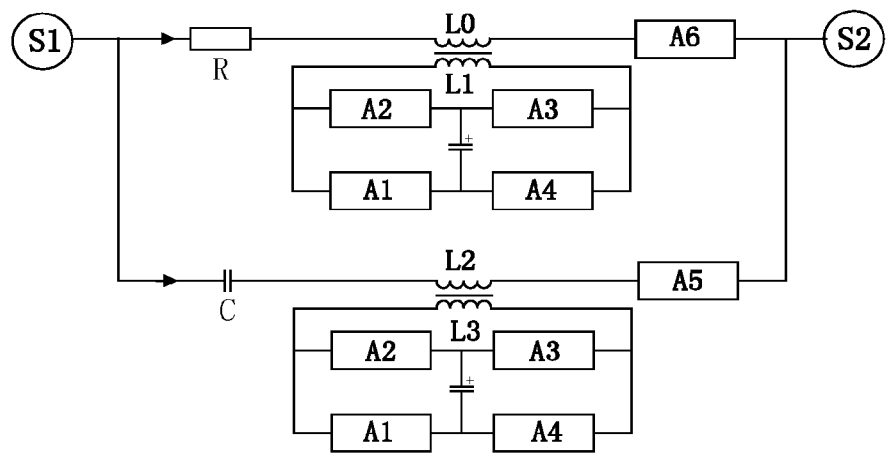
Fig.5（d）

DC CIRCUIT BREAKER COMBINING MAGNETIC INDUCTION TRANSFER AND RESISTANCE CURRENT LIMITING

FIELD OF THE INVENTION

The present invention relates to the technical field of electric devices, and more specifically to a DC circuit breaker combining magnetic induction transfer and resistance current limiting.

BACKGROUND OF THE INVENTION

A hybrid circuit breaker consisting of a high speed mechanical switch and a power semiconductor device has advantages such as large discharge capacity, fast turn-off speed, and strong current-limiting capability and so on and thus has become a hot issue to study in the field of breaking a large-capacity system. Compared with other hybrid solutions, a hybrid DC circuit breaker that breaks current using a power semiconductor device with a full control function has a faster separating speed and facilitates separation of rational current. However, when separating current using the full-control type power semiconductor device, its current transfer loop usually needs a full control type power semiconductor device to cut the current, resulting in a high control complexity and cost, which restricts its promotion and application.

In a traditional transfer current circuit, a capacitor charging circuit is directly connected to a main loop without isolation; during a breaking process, a charging power source and the main loop will suffer interference; besides, it is highly demanding on voltage withstanding of the main loop charging power source, and the breaking is unreliable.

Traditional DC circuit breakers cannot handle the requirements of two-way limitation and separation fault current when tide current in a DC grid is uncertain; or in order to satisfy two-way work scenarios, the size and manufacturing cost of the circuit breakers will always increase significantly.

Because system impedance of a DC power system is very small, when a short-circuit fault occurs, the fault current rises very quickly with a large current amplitude; therefore, it is highly demanding on the current breaking capability of DC circuit breakers, such that the manufacturing technology of the DC circuit breakers is rather difficult with a high manufacturing cost.

SUMMARY OF THE INVENTION

In view of the drawbacks existing in the prior art, the present invention provides a DC circuit breaker combining magnetic induction transfer and resistance current limiting, the circuit breaker comprising: a main current circuit, a current-limiting branch, a breaking branch, and an energy dissipation branch;

the main current circuit, the current-limiting branch, the breaking branch, and the energy dissipation branch are connected in parallel;

the current-limiting branch comprises a first magnetic induction transfer module;

the breaking circuit comprises a second magnetic induction transfer module;

a first inductor (L1) in the first magnetic induction transfer module and a branch inductor (L0) in the current-limiting branch are coupled to form a mutual inductor;

a third inductor (L3) in the second magnetic induction transfer module and a second inductor (L2) in the transfer current loop are coupled to form a mutual inductor.

Preferably, the main current circuit comprises a mechanical switch or a combination of a mechanical switch and a power electronic device; the mechanical switch is an electromagnetic repulsion-based high-speed mechanical switch, a high-speed motor-driven mechanical switch or an explosion-driven high-speed mechanical switch.

Preferably, in the current-limiting branch, the inductor (L0), a resistor (R), and a second controllable device (A6) are connected in series; the resistor (R) is one of a carbon film resistor, a metal film resistor, a metal oxidized film resistor, a wire wound resistor, a large power wire wound resistor, an organic solid resistor, a fusing resistor, a cement resistor, a superconducting current-limiting resistor, a liquid-state metal resistor, and a PTC resistor; the second controllable device (A6) is any one of a thyristor or a trigger gap, or any combination thereof.

Preferably, in the breaking branch, the second inductor (L2), a first capacitor (C), and a first controllable device (A5) are connected in series; the first controllable device (A5) is any one of a thyristor, a full-control type semiconductor device, an air trigger gap, and a vacuum trigger gap, or any combination thereof.

Preferably, the first magnetic induction transfer module and the second magnetic induction transfer module are both comprised of an inductive inductance circuit and a discharging capacitance circuit;

the discharging capacitance circuit comprises a first power semiconductor device (A1), a second power semiconductor device (A2), a third power semiconductor device (A3), a fourth power semiconductor device (A4), and a capacitor; the first power semiconductor device (A1) and the fourth power semiconductor device (A4) are connected in series to form a discharging capacitance circuit branch; the second power semiconductor device (A2) is in serial connection with the third power semiconductor device (A3); between the first power semiconductor device (A1) and the fourth power semiconductor device (A4) is provided a first endpoint; between the second power semiconductor device (A2) and the third power semiconductor device (A3) is provided a second endpoint; the capacitor is connected between the first endpoint and the second endpoint;

the inductive inductance circuit comprises inductors (L1, L3);

the discharging capacitance circuit is in parallel connection with the inductive inductance circuit.

Preferably, the first power semiconductor device (A1), the second power semiconductor device (A2), the third power semiconductor device (A3), and the fourth power semiconductor device (A4) are uncontrollable or semi-controlled power semiconductor devices, vacuum trigger gaps, or air trigger gaps, or a combination thereof; the power semiconductor devices include, but not limited to, any one of a power diode, a thyristor, an IGCT, an IGBT, a GTO, or any combination thereof; the inductors are hollow inductors or magnetic core-contained inductors, comprising one inductor or more inductors connected in series or in parallel.

Preferably, the energy dissipation branch comprises one of arrester consisting of a zinc oxide valve block or a varistor, or a combination thereof.

The present invention produces the following beneficial effects:

1. In the present invention, the current-limiting branch and the breaking branch are connected in parallel; by controlling turning on and off of the devices at different time, the current rising speed and amplitude of the current is limited, and the short-circuit current is completely cut. In this way, the volume and manufacturing cost of the circuit breaker can be effectively reduced.

2. Fast current transfer is realized by utilizing magnetic induction transfer modules. The main loop capacitance needs not be pre-charged; isolation between a secondary charging circuit and the main loop enables a fast transfer speed; moreover, the discharging capacitance of the magnetic induction transfer modules adopt a bridge structure, which may two-way limit and break the fault current, thereby greatly reducing the volume and cost.

3. The main loop capacitor only needs a one-way charging, which may reduce the volume and cost of the capacitor with a high breaking reliability.

BRIEF DESCRIPTION OF THE ACCOMPANYING DRAWINGS

Hereinafter, the preferred embodiments of the present invention will be illustrated in further detail with reference to the accompanying drawings.

Figure 5:
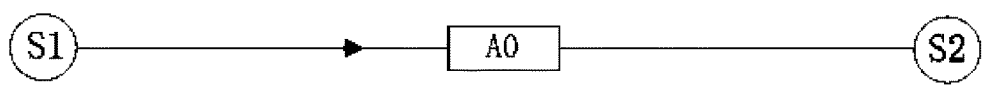
Figure 5:
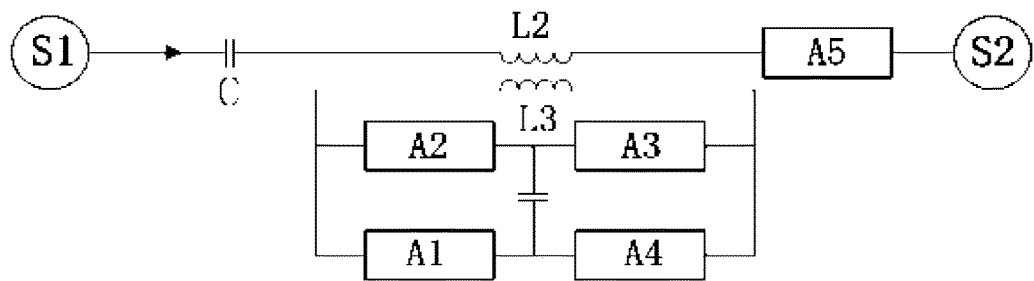
Figure 5:
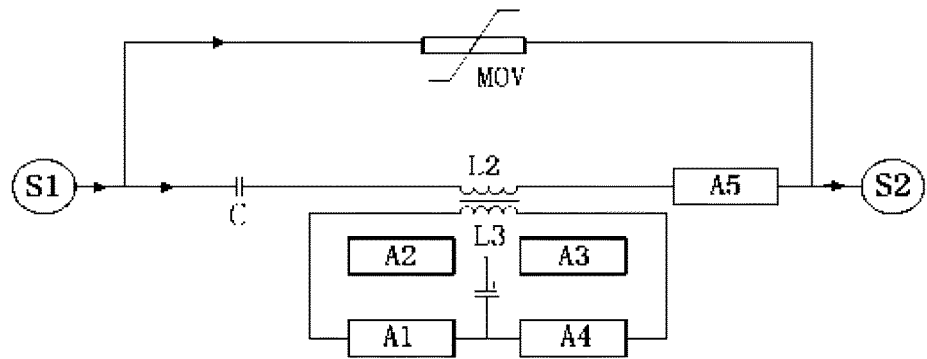
Figure 5:
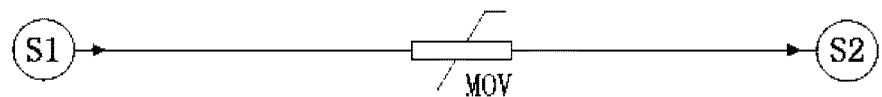
Figure 6:
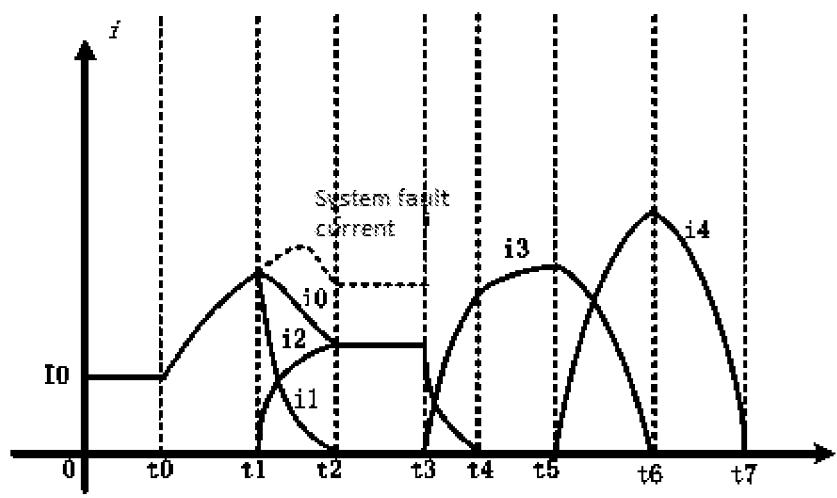
Figure 7:
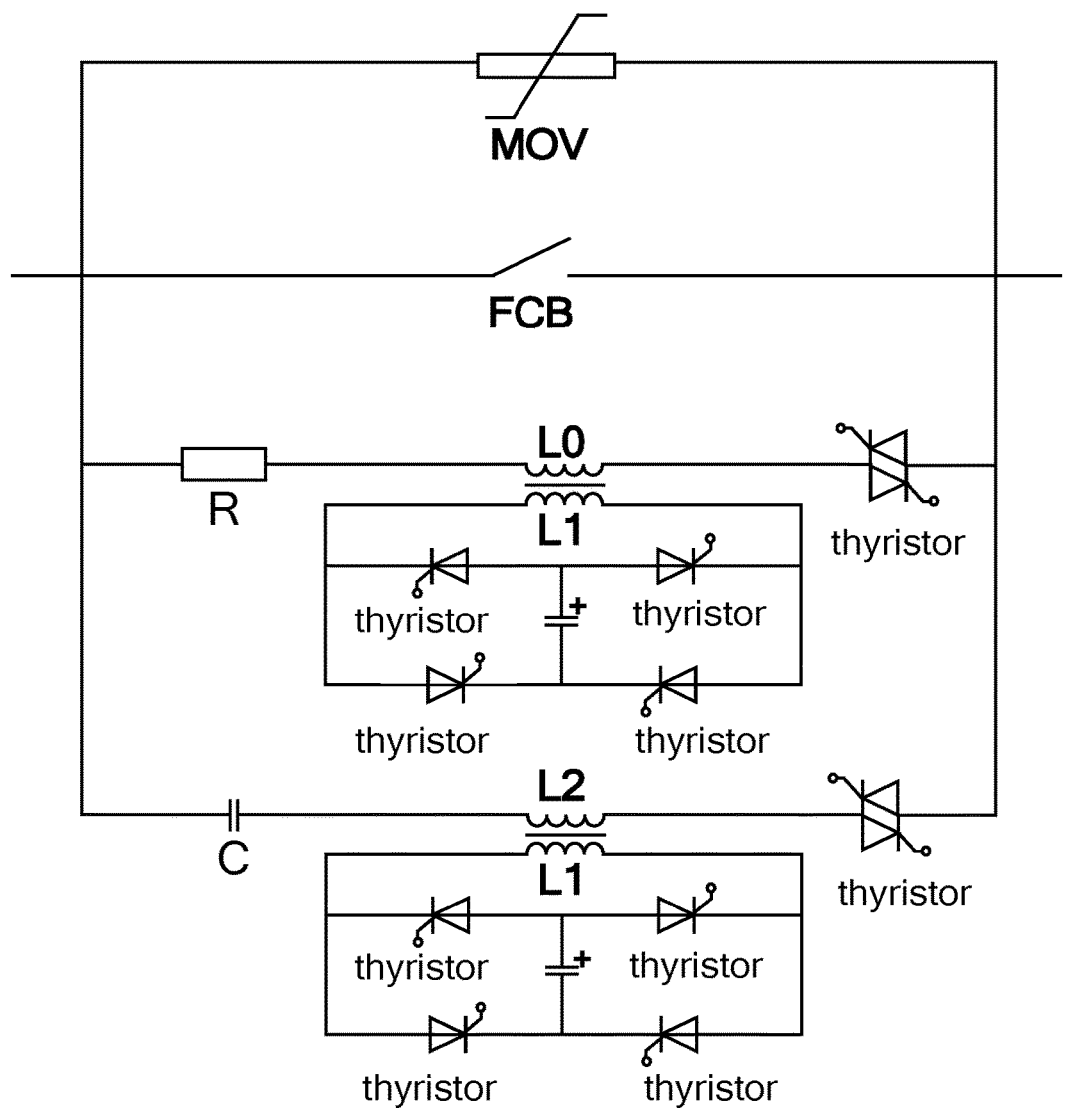
Figure 8:
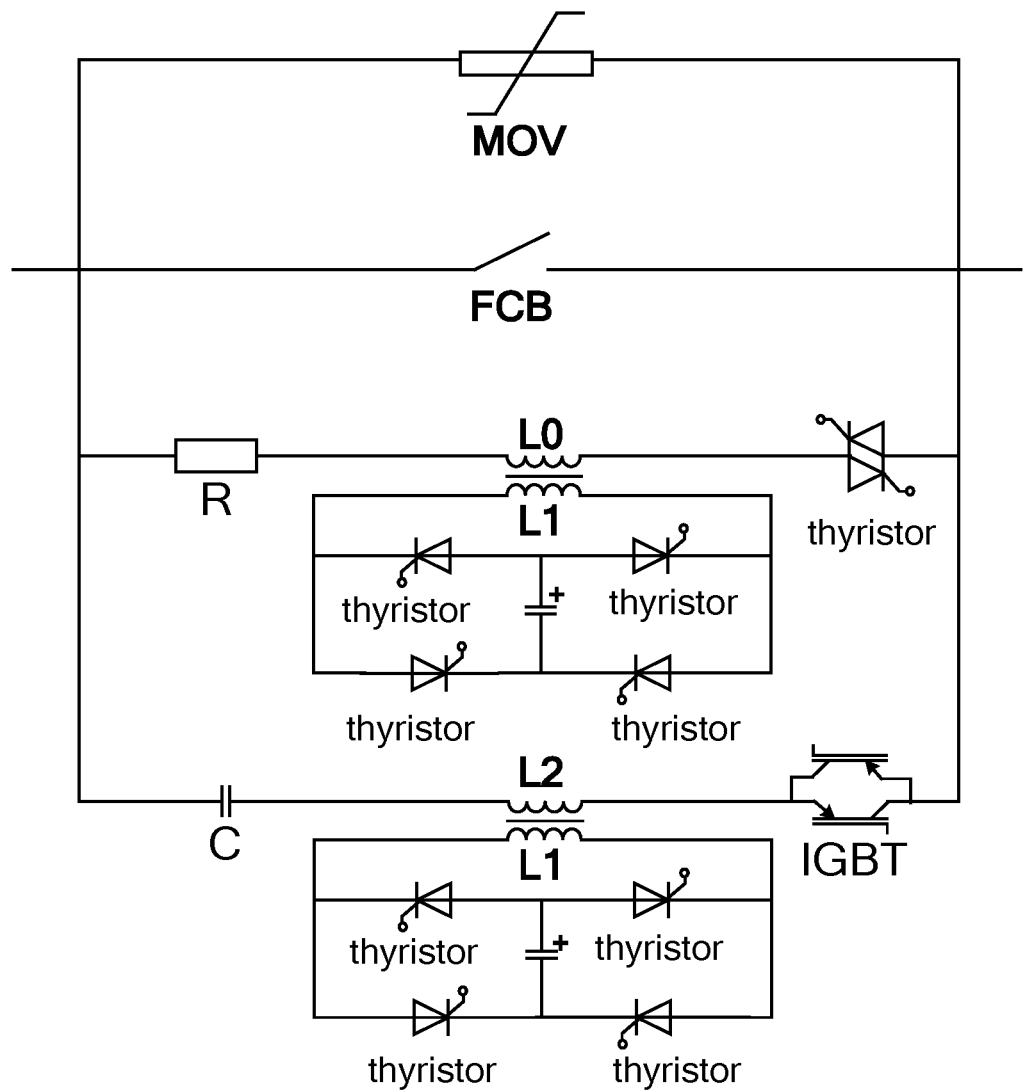
Figure 9:
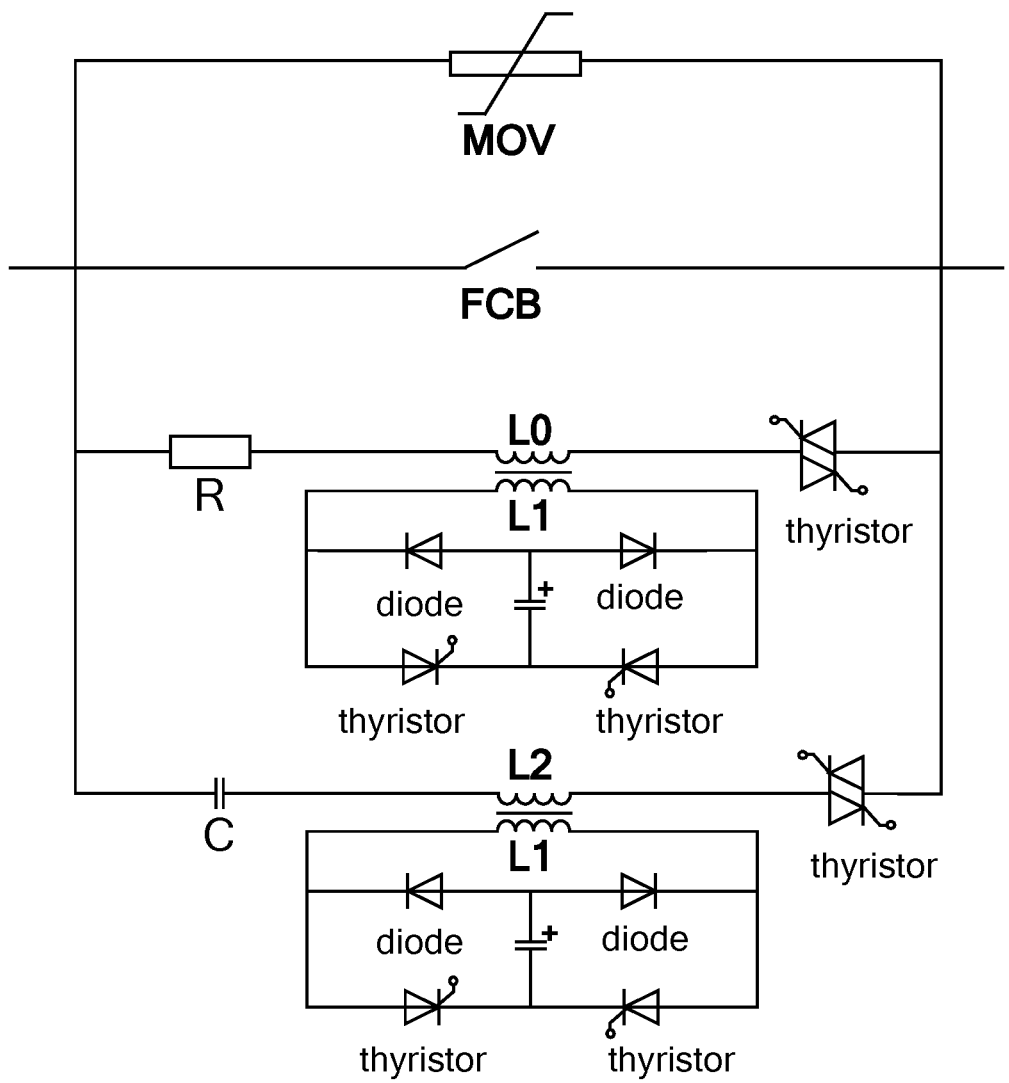
Figure 10:
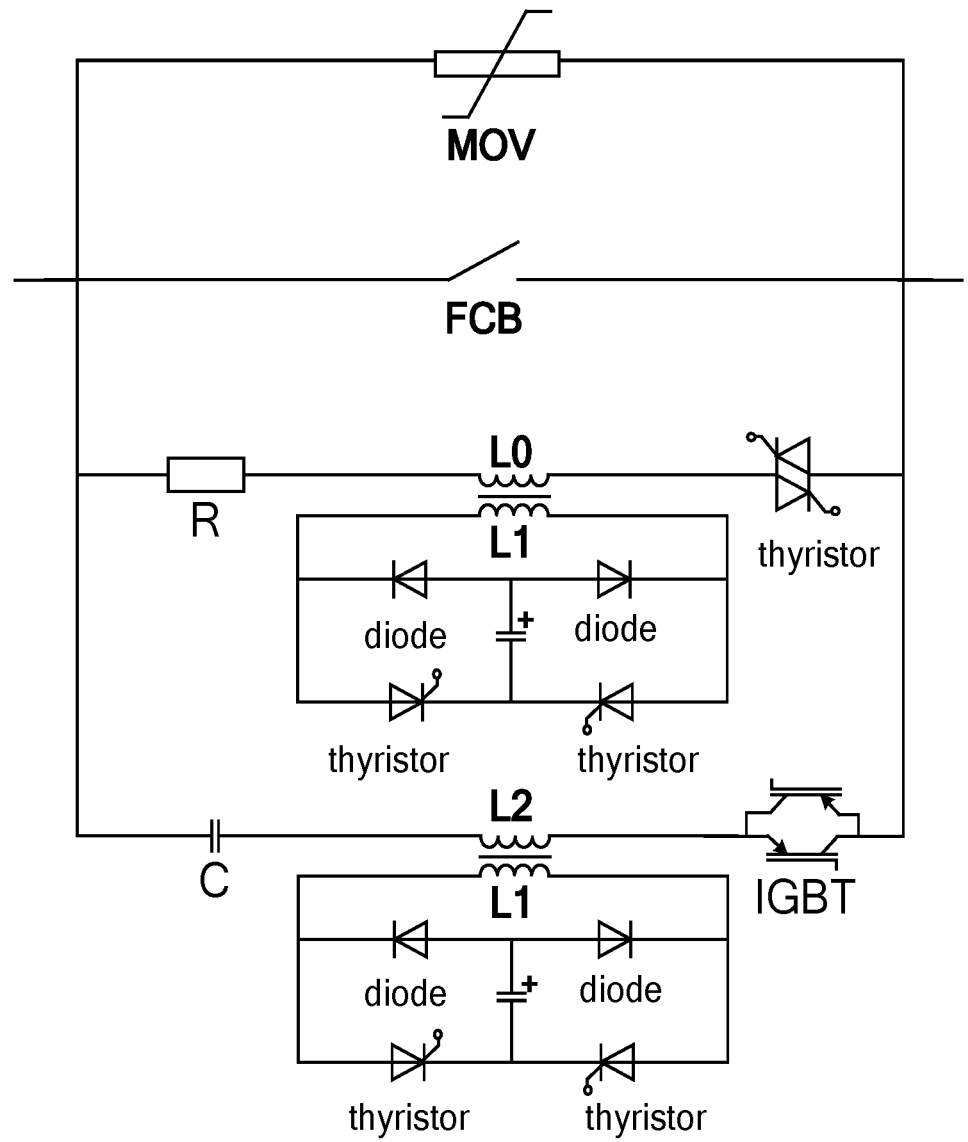
Figure 11:
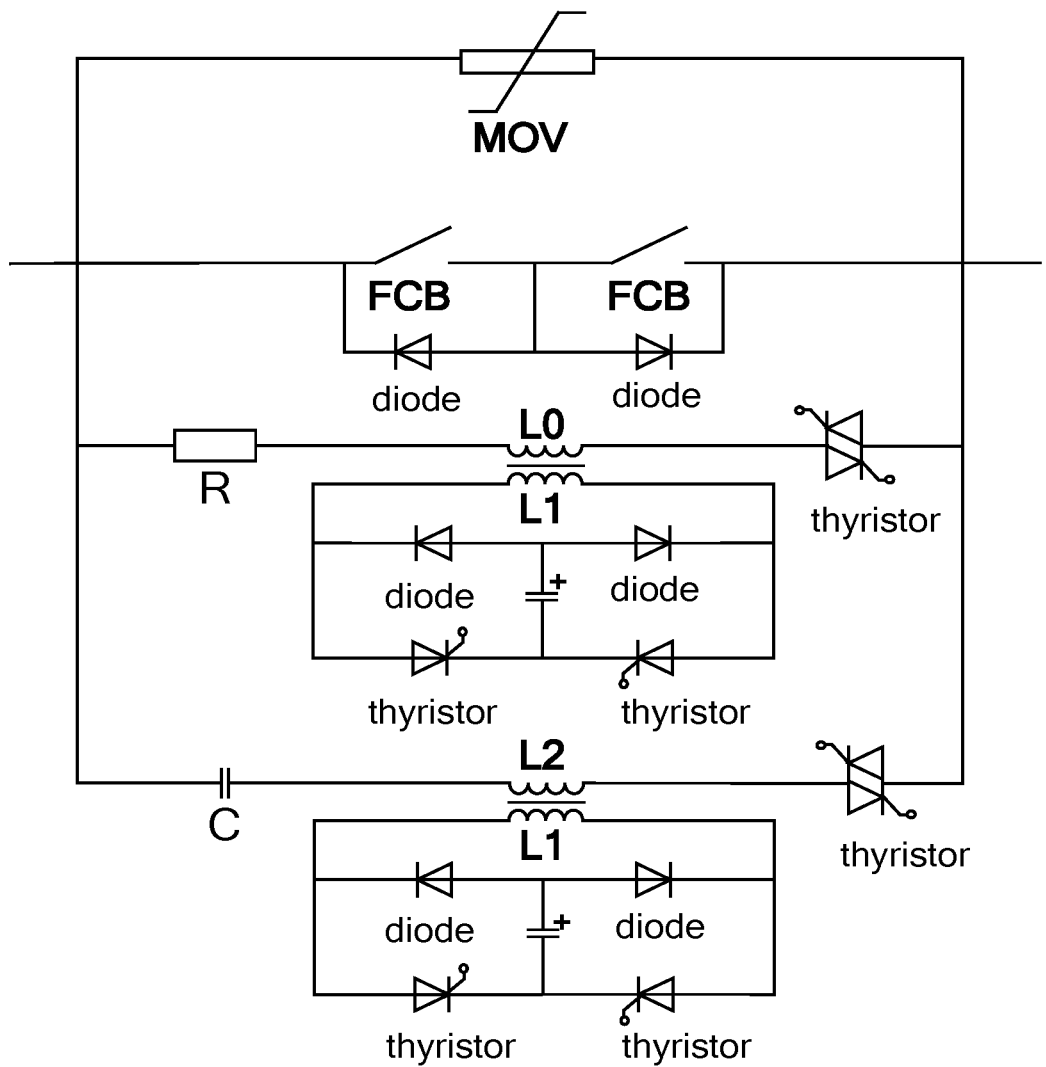
Figure 12:
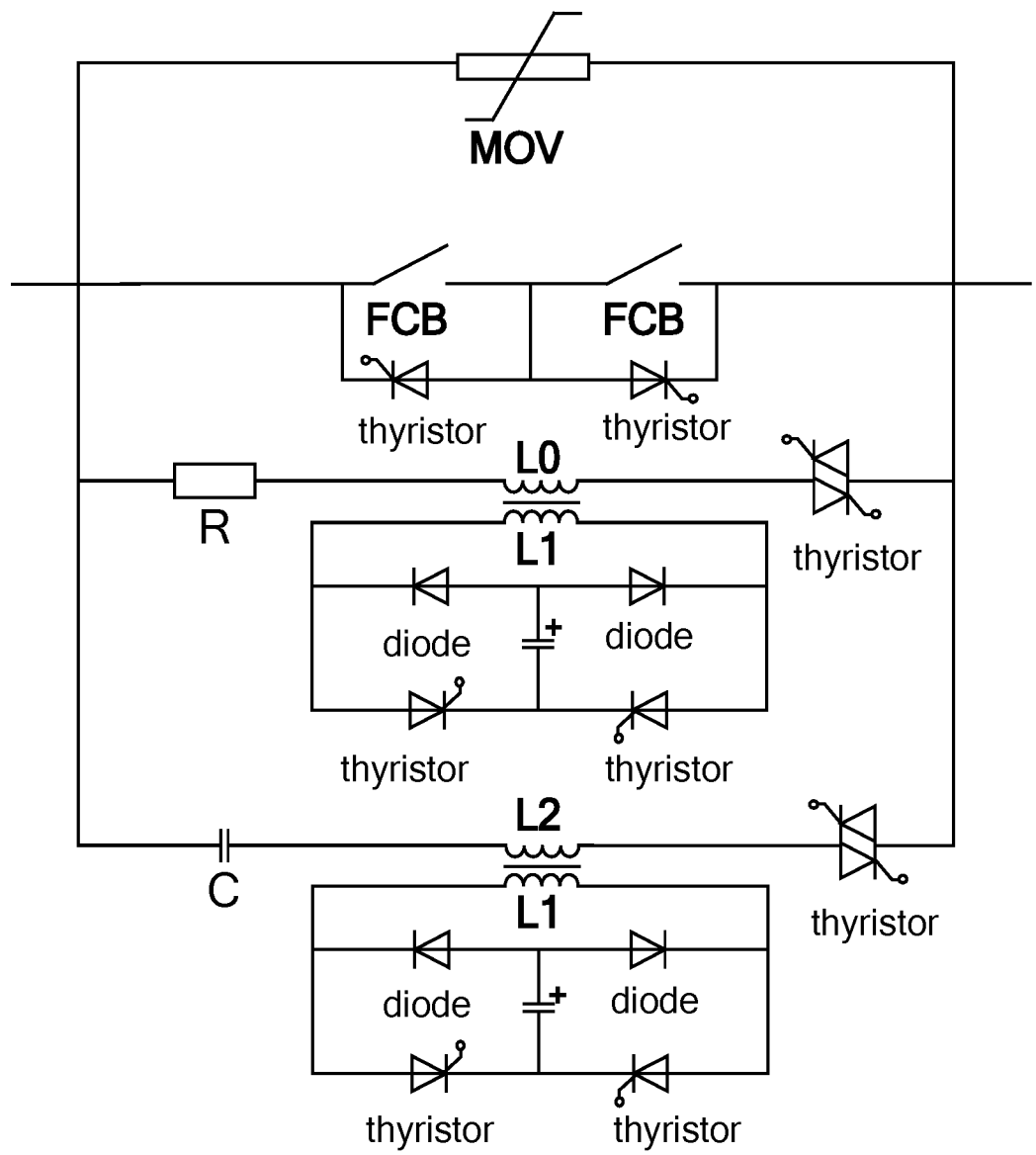
Figure 13:
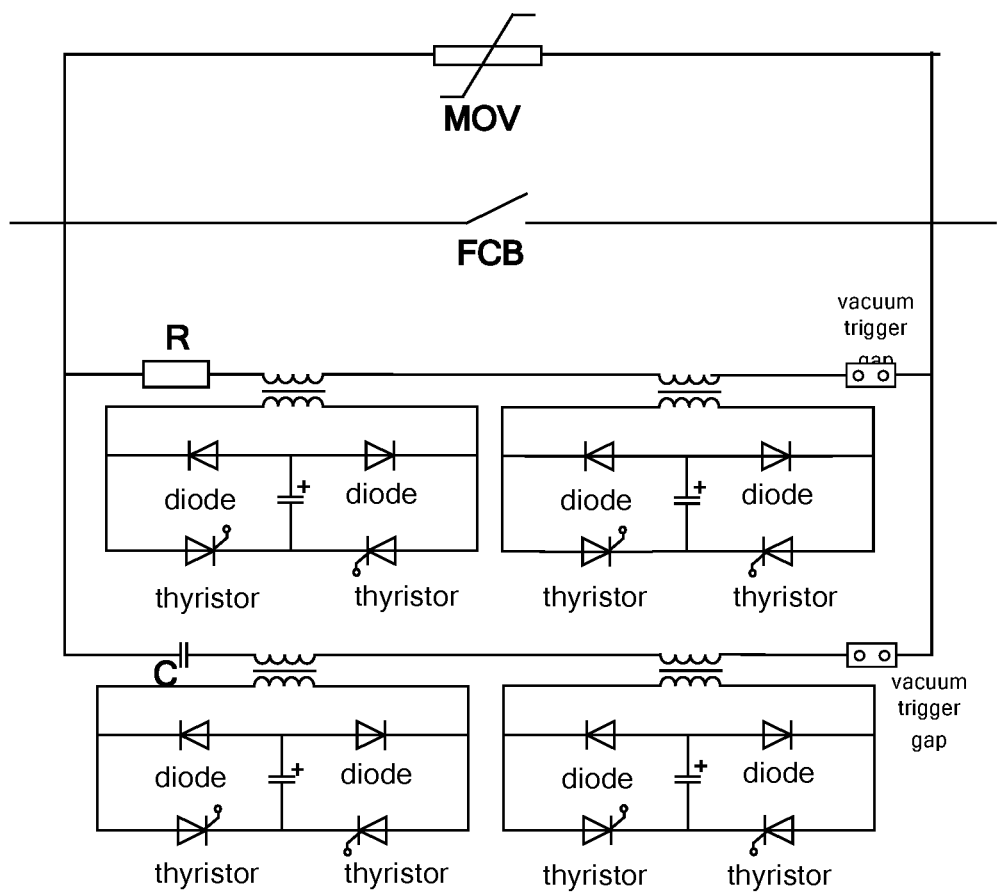
Figure 14:
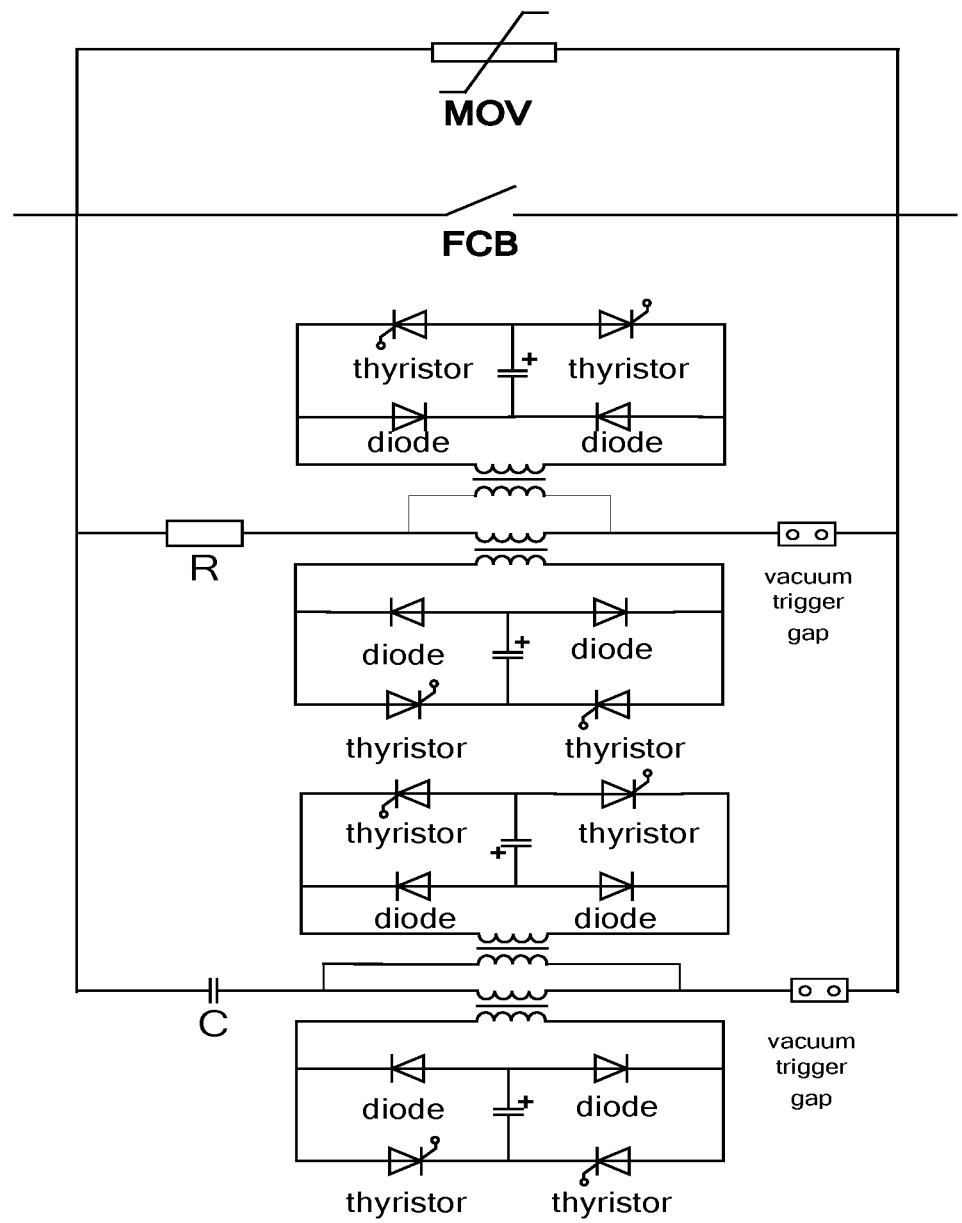
Figure 15:
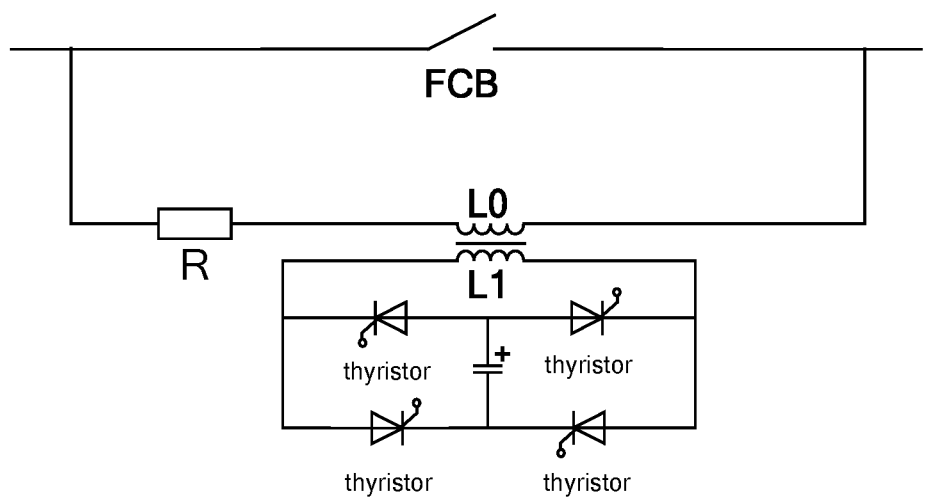

FIGS. 5(*a*)-5(*g*) are diagrams of current flowing directions when separating current;

FIG. 6 is a curve showing current changes in respective circuits when separating current;

FIG. 7 is a diagram of a preferred embodiment of the present invention;

FIG. 8 is a diagram of a preferred embodiment of the present invention;

FIG. 9 is a diagram of a preferred embodiment of the present invention;

FIG. 10 is a diagram of a preferred embodiment of the present invention;

FIG. 11 is a diagram of a preferred embodiment of the present invention;

FIG. 12 is a diagram of a preferred embodiment of the present invention;

FIG. 13 is a diagram of a preferred embodiment of the present invention;

FIG. 14 is a diagram of a preferred embodiment of the present invention;

FIG. 15 is a diagram of a preferred embodiment when the present invention is used as a two-way resistance-type current limiter.

DETAILED DESCRIPTION OF THE PREFERRED EMBODIMENTS

To enable those skilled in the art to better understand solutions of the present invention. Hereinafter, the technical solutions in the embodiments of the present invention will be described in a clear and comprehensive manner in conjunction with FIGS. 1-13 in the embodiments of the present invention. Apparently, the embodiments as described are only part of embodiments of the present invention, rather than all embodiments. Based on the embodiments in the present invention, all other embodiments obtained by a person of normal skill in the art without exercise of inventive work should fall within the scope of the present invention.

The present embodiment provides a structural diagram of a circuit breaker body. With FIG. 1 as an example, the circuit breaker comprises a main current circuit, a current-limiting branch, a breaking branch, and an energy dissipation branch.

Figure 2:
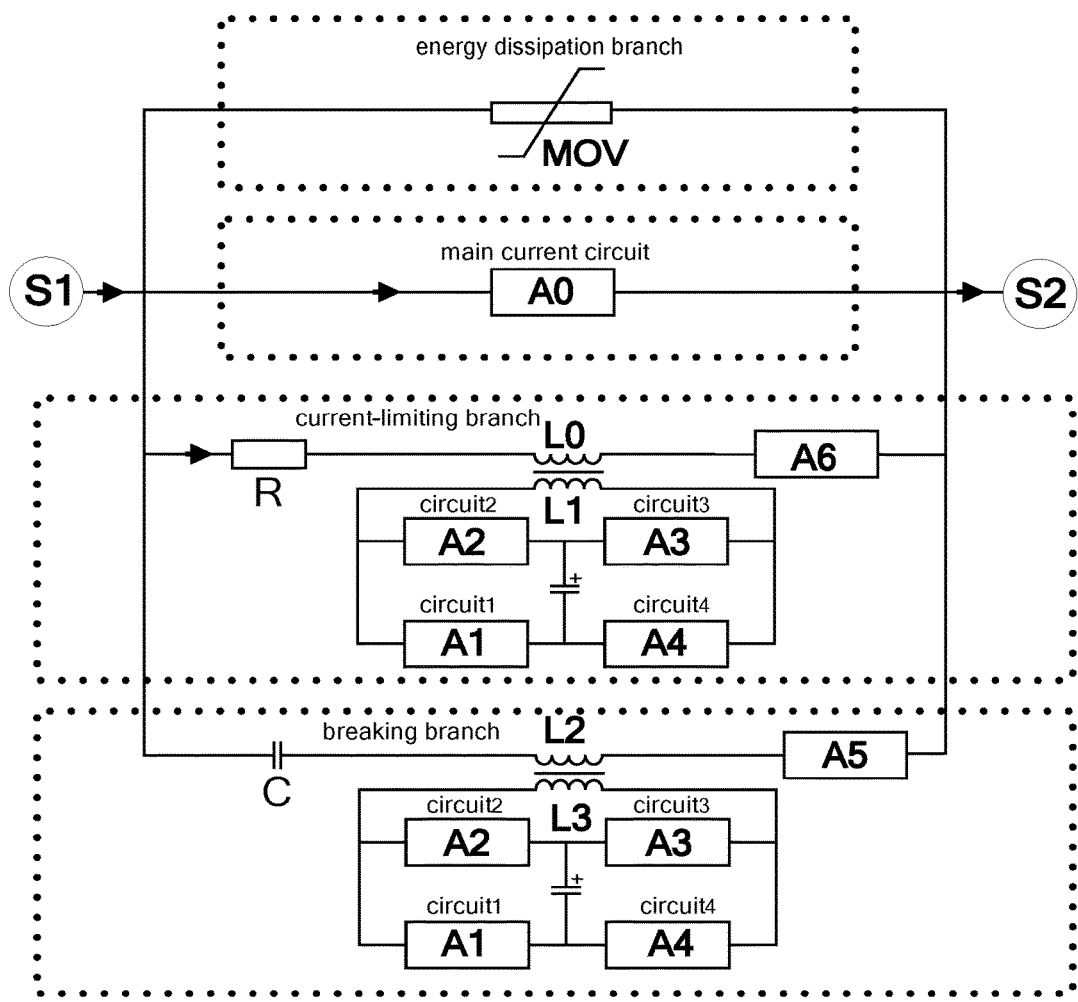
FIG. 2 illustrates a structural diagram when a circuit breaker of the present invention is working.
Figure 3:
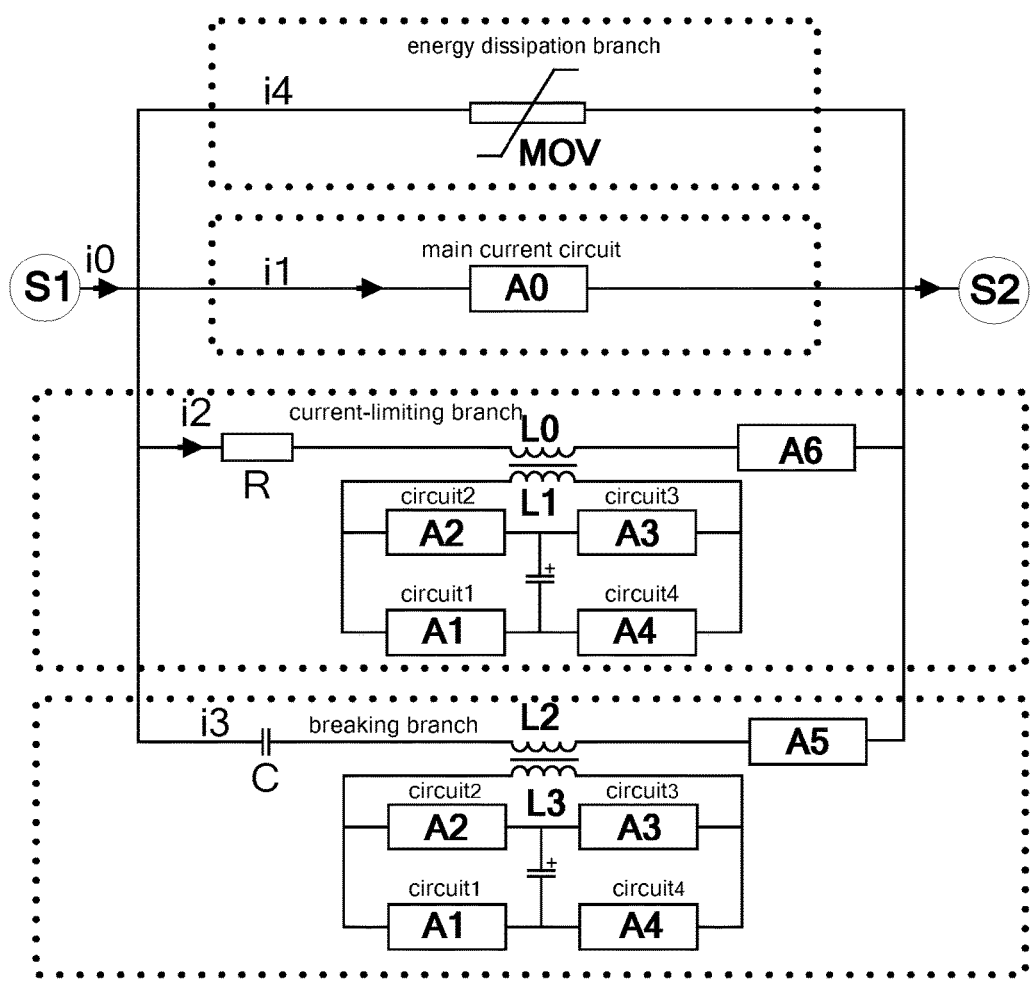
FIG. 3 illustrates another structural diagram when a circuit breaker of the present invention is working.

In order to better illustrate a separating procedure of a circuit breaker, as shown in FIG. 2, the present embodiment provides a structural diagram of a circuit breaker with current flowing from a system access end S1 to a system access end S2. As illustrated in FIG. 3, the present embodiment further provides a structural diagram of a circuit breaker with current flowing in another direction from a system access end S1 to a system access end S2.

Figure 1:
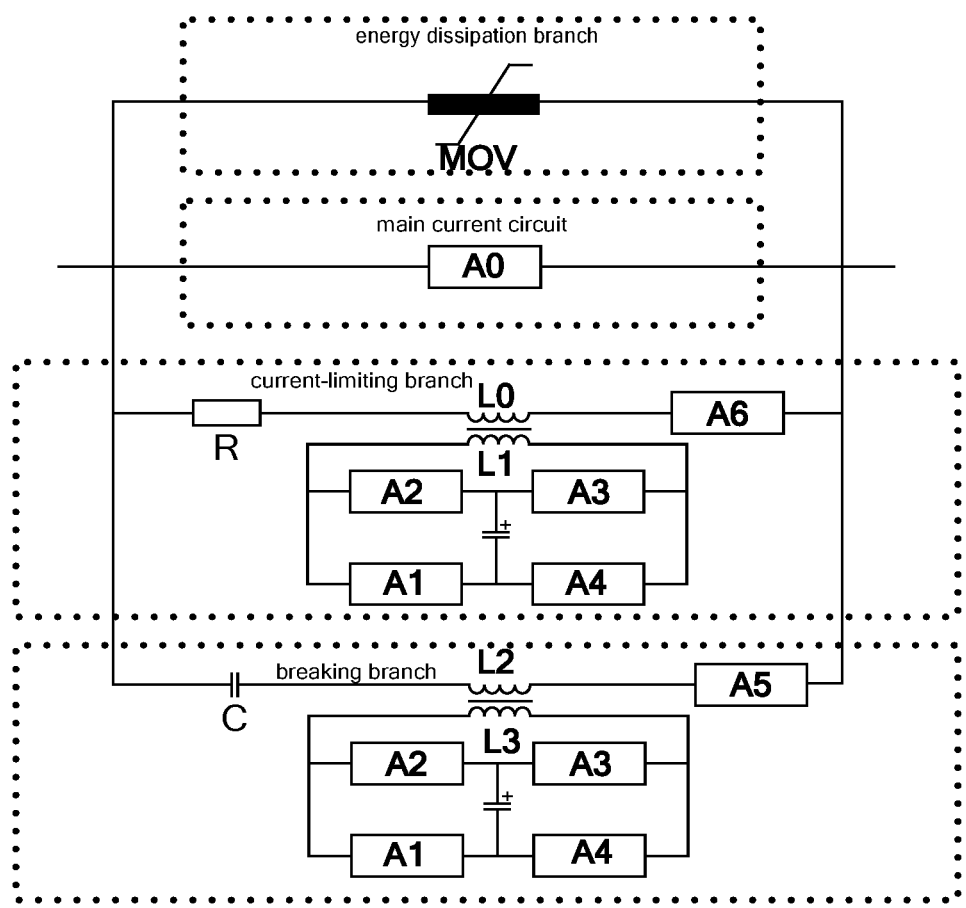
FIG. 1 illustrates a structural principle diagram of a circuit breaker of the present invention.

As shown in FIGS. 1-3, the DC circuit breaker combining magnetic induction transfer and resistance current limiting according to the present invention comprises a main current branch, a current-limiting branch, a breaking branch, and an energy dissipation branch, wherein the current-limiting branch and the breaking branch each comprises a magnetic induction transfer module, and the main current circuit, the current-limiting branch, the breaking branch, and the energy dissipation branch are connected in parallel; an inductor L1 in the magnetic induction transfer module of the current-limiting branch and an inductor L0 in the current-limiting branch form a mutual inductor; an inductor L3 in the magnetic induction transfer module of the breaking branch and an inductor L2 in the transfer current loop form a mutual inductor.

The main current circuit comprises a mechanical switch or a combination of a mechanical switch and a power electronic device.

The current-limiting branch comprises the inductor L0, a resistor R, and a controllable device A6 connected in series; the breaking branch comprises the inductor L2, a capacitor C, and a controllable device A5 connected in series, and the inductor L0 and the inductor L1 in the magnetic induction transfer module are coupled into a mutual inductor; the inductor L2 and the inductor L3 in the magnetic induction transfer module are coupled into a mutual inductor; the magnetic induction transfer module comprises an inductive inductance circuit and a discharging capacitance circuit, wherein:

The discharging capacitance circuit comprises a circuit 1 including a power semiconductor device A1, a circuit 2 including a power semiconductor device A2, and a circuit 3 including a power semiconductor A3, a circuit 4 including a power semiconductor device A4, and a circuit 5 including a capacitor; and the circuit 1 is in serial connection with the circuit 4; the circuit 2 is in serial connection with the circuit 3; the circuit 1 and the circuit 4 are connected in series to form a discharging capacitance circuit branch 1-4 that is connected in parallel to the inductance circuit.

Moreover, one end of the inductive inductance circuit is connected to one end of the power semiconductor device A1 so as to implement a connection to one end of the branch 1-4; the other end of the power semiconductor device A1 is connected to one end of the power semiconductor device A4 so as to implement a serial connection between the circuit 1 and the circuit 4; the other end of the power semiconductor device A4 is connected to the other end of the inductive inductance circuit so as to implement a connection between the other end of the branch 1-4 and the inductive inductance circuit, thereby implementing a parallel connection between the branch 1-4 and the inductive inductance circuit; the circuit 2 and the circuit 3 are connected in series to form a discharging capacitance circuit branch 2-3, and the branch 2-3 is in parallel connection to the inductive inductance circuit.

Moreover, one end of the inductive inductance circuit is connected to one end of the power semiconductor device A2 so as to implement a connection to one end of the branch 2-3; the other end of the power semiconductor device A3 is connected to one end of the power semiconductor device A2 so as to implement a serial connection between the circuit 2 and the circuit 3; the other end of the power semiconductor device A3 is connected to the other end of the inductive inductance circuit so as to implement connection between the other end of the branch 2-3 and one end of the inductive inductance circuit, thereby implementing a parallel connection between the branch 2-3 and the inductive inductance circuit.

Between an endpoint between the circuit 1 and the circuit 4 and an endpoint between the circuit 2 and the circuit 3 is connected a circuit 5 comprising the capacitor; wherein the high-speed mechanical switch may be any one of an electromagnetic repulsion-based high-speed mechanical switch, a high-speed motor-driven mechanical switch or an explosion-driven high-speed mechanical switch.

The devices A1-A4 are uncontrollable or semi-controlled power semiconductor devices, vacuum trigger gaps, or air trigger gaps, or a combination thereof; the power semiconductor devices include, but not limited to, any one of a power diode, a thyristor, an IGCT, an IGBT, a GTO, or any combination thereof. The controllable device A5 is any one of a thyristor, a full-control type semiconductor device, an air trigger gap, and a vacuum trigger gap, or any combination thereof. The inductors are hollow inductors or magnetic core-contained inductors, which may comprise one inductor or more inductors connected in series or in parallel. The resistor comprises one of a carbon film resistor, a metal film resistor, a metal oxidized film resistor, a wire wound resistor, a large power wire wound resistor, an organic solid resistor, a fusing resistor, a cement resistor, a superconducting current-limiting resistor, a liquid-state metal resistor, and a PTC resistor.

The overvoltage limiting circuit comprises one of an arrester consisting of a varistor or a zinc oxide valve block, or any combination of a plurality of the arresters.

It is easily understood that in the art, the circuit breaker may also comprise a control system or a controller so as to control on and off of relevant components in the circuit breaker.

Figure 4:
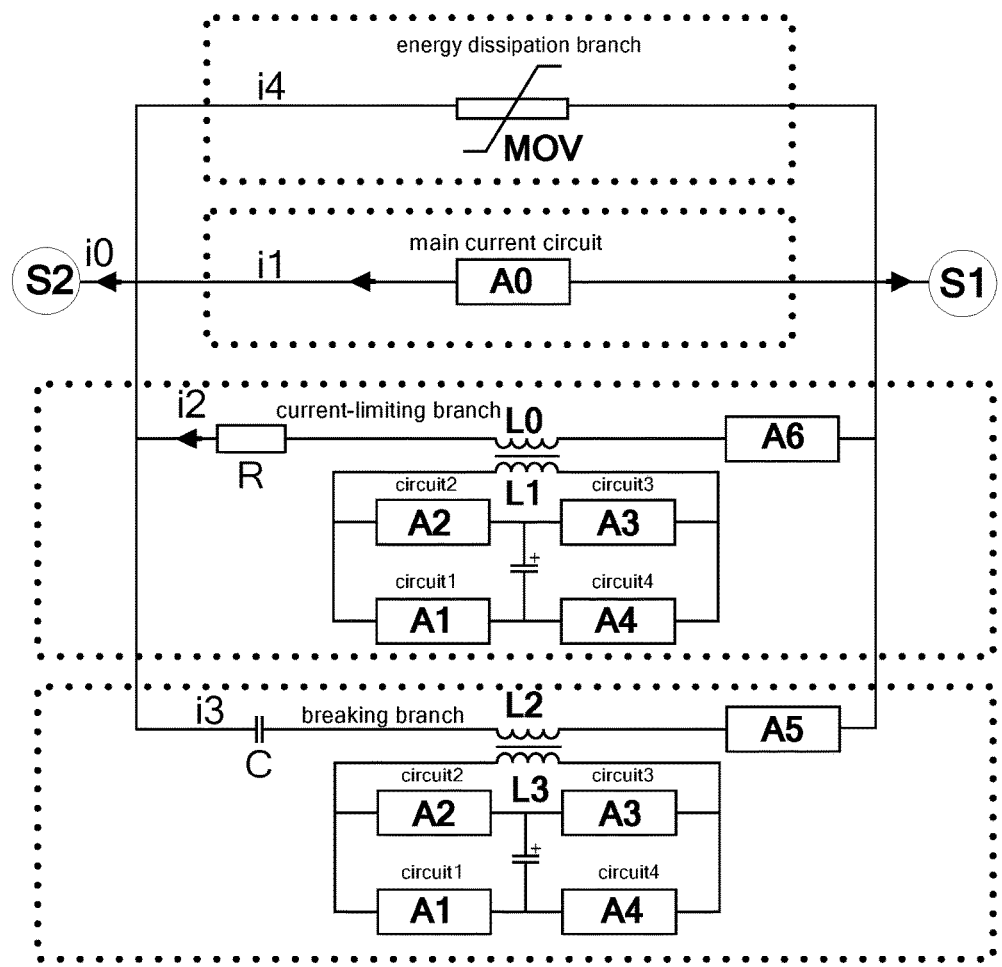
FIG. 4 illustrates a schematic diagram of current marks of a current-limiting branch when separating current.

FIG. 4 illustrates current marks of respective branches when limiting current, where i0 denotes a current flowing into the circuit breaker, i1 denotes a current flowing through a main current circuit, i2 denotes a current flowing through a current-limiting branch, i3 denotes a current flowing through a breaking current, and i4 is a current flowing through an energy dissipation circuit.

FIG. 4 illustrates current directions of respective branches in a transfer current circuit when separating current, specifically corresponding current directions of respective branches from time t0-time t7. FIG. 5 illustrates curves of current changes of respective branches when separating current, which exemplarily describes a working procedure of a circuit breaker of the present invention, including the following aspects:

The system works normally; the current all flows through the main current circuit, as shown in FIG. 5(a), wherein a rational current of the system is I0.

At time t0, the system has a short-circuit fault; current of the main current circuit begins rising; between t0 and t1, when the current exceeds a system short-circuit threshold, the system is controlled to act, and the device A0 starts action.

At time t1, an enough arc voltage is established between mechanical contacts to control the semiconductor devices A1-A4 in the magnetic induction modules of the current-limiting branch to be conducted according to a certain time sequence, and the magnetic induction module circuits are conducted; the capacitor C starts discharging; the coupling inductor causes an induction voltage to be produced at two ends of the inductor L0 in the transfer current circuit; the current-limiting branch starts discharging. The current flowing through the main current circuit is transferred to the current-limiting branch, as illustrated in FIG. 5(b).

At time t2, the main current circuit mechanical switch is completely opened, and all of the main circuit current is transferred to the current-limiting branch; at this point, the fault current has reached a stable value; between t2 and t3, the current-limiting branch withstands all of the short-circuit current, as shown in FIG. 5(c).

At time t3, the semiconductor device A5 is conducted by the control system, and meanwhile, the semiconductor devices A1-A4 in the magnetic induction modules of the breaking branch are conducted according to a certain time sequence; the magnetic induction module circuit is conducted; the capacitor C starts discharging; a voltage is inducted out at both ends of the inductor L2; the short-circuit current starts to be transferred from the current-limiting branch to the breaking branch, as shown in FIG. 5(d).

At time t4, the short-circuit current is transferred to the breaking branch; at this point, the controllable device A6 in the breaking current-limiting branch to break the current-limiting branch, as shown in FIG. 5(e).

At time t5, the voltage value for the short-circuit current to charge the capacitor C reaches the threshold of the energy dissipation circuit, and the energy dissipation circuit is conducted. The current starts to be transferred to the energy dissipation circuit, as shown in FIG. 5(f). Due to a voltage clamping function of the energy dissipation circuit, the rising amplitude of the voltage at both ends of the circuit breaker is small.

At time t6, all of the current in the breaking branch is transferred to the energy dissipation circuit, as shown in FIG. 5(g). At this point, the voltage at both ends of the circuit breaker reaches a maximum value, which is an overvoltage peak value at both ends of the circuit breaker during a breaking process. Afterwards, current in the energy dissipation circuit starts falling, the voltage at both ends of the circuit breaker also starts gradually falling; when the system current is lower than the minimum on current 1 mA of the energy dissipation circuit, the energy dissipation circuit is turned off, and the voltage at both ends of the energy dissipation circuit drops rapidly.

At time t7, the current in the energy dissipation circuit is 0; the capacitor C in the magnetic induction transfer module is recharged, and breaking of the circuit breaker is completed; the voltage at both ends of the circuit breaker falls to the system voltage.

It should be noted that the high-speed mechanical switch is an electromagnetic repulsion-based high-speed mechanical switch, a high-speed motor-driven mechanical switch or an explosion-driven high-speed mechanical switch.

The devices A1 to A4 are uncontrollable or semi-controlled power semiconductor devices, vacuum trigger gaps, or air trigger gaps, or a combination thereof; the power semiconductor devices include, but not limited to, any one of a power diode, a thyristor, an IGCT, an IGBT, a GTO, or any combination thereof. The controllable device A5 is any one of a thyristor, a full-control type semiconductor device, an air trigger gap, and a vacuum trigger gap, or any combination thereof. The inductors are hollow inductors or magnetic core-contained inductors, which may comprise one inductor or more inductors connected in series or in parallel. The energy dissipation circuit is one or a combination of more of an arrester consisting of a zinc oxide valve block or a varistor. The resistor comprises one of a carbon film resistor, a metal film resistor, a metal oxidized film resistor, a wire wound resistor, a large power wire wound resistor, an organic solid resistor, a fusing resistor, a cement resistor, a superconducting current-limiting resistor, a liquid-state metal resistor, and a PTC resistor.

If the energy dissipation circuit and the breaking circuit are removed, the circuit structure may be used as a hybrid current limiter, i.e., when a short-circuit fault comes, the rising speed and amplitude of the short-circuit current is limited, which reduces the demand on the current capacity of an open end of the circuit breaker, as shown in FIG. 15.

Besides, the present invention does not require complete symmetry of the circuit in the circuit breaker.

The present invention discloses a DC circuit breaker combining magnetic induction transfer and a resistance current limiting, the circuit breaker comprising a main current circuit, a current limiting branch, a breaking branch, and an energy dissipation branch, wherein the current-limiting branch and the breaking branch each comprises a magnetic induction transfer module, and the main current circuit, the current-limiting branch, the breaking branch, and the energy dissipation branch are connected in parallel. When the circuit breaker needs to break the current, by controlling the device of the main current circuit to act, the magnetic induction transfer module is triggered to discharge, successively conducting the current limiting branch and the breaking branch. By restricting the rising rate and amplitude of the short-circuit current through the current-limiting branch, the current may be limited to a lower range and then turned off, which reduces the capacitance capacity and the cost. By connecting the current-limiting branch and the breaking circuit in parallel, the need of selective protection of the circuit breaker may be satisfied, such that the circuit breaker is opened at different time points. By isolating the circuit breaker main loop from the secondary charging circuit, the breaking reliability can be significantly enhanced. Meanwhile, the present invention adopts a magnetic induction transfer module comprising an inductive induction branch and a discharging capacitance branch connected in parallel, which reduces the breaking branch's need of the capacitor capacity and effectively reduces the volume of the capacitor in the breaking circuit; moreover, due to a very low pre-charging voltage of the capacitor in the magnetic induction transfer module circuit, which ensures effective electrical isolation between the secondary charging circuit and the circuit breaker main loop. A bridge circuit is used for the magnetic induction transfer modules of the current-limiting branch and the breaking branch to realize a two-way transfer and breaking of the current, which greatly reduces cost and volume.

As shown in FIGS. 7-15, the present invention also has a plurality of alternative embodiments.

The content above is a further detailed depiction of the present invention in conjunction with specific preferred embodiments. It should not be regarded that the preferred embodiments of the present invention are limited thereto; to those skilled in the art, several simple deductions or substitutions may also be made without departing from the idea of the present invention, which should be regarded as falling within the protection scope determined by the submitted claims.

The invention claimed is:

1. A DC circuit breaker combining magnetic induction transfer and resistance current limiting, the circuit breaker comprising: a main current circuit, a current-limiting branch, a breaking branch, and an energy dissipation branch; wherein the main current circuit, the current-limiting branch, the breaking branch, and the energy dissipation branch are connected in parallel;

the current-limiting branch comprises a first magnetic induction transfer module;

the breaking circuit comprises a second magnetic induction transfer module;

a first inductor (L1) in the first magnetic induction transfer module and a branch inductor (L0) in the current-limiting branch are coupled to form a mutual inductor;

a third inductor (L3) in the second magnetic induction transfer module and a second inductor (L2) in the transfer current loop are coupled to form a mutual inductor.

2. The DC circuit breaker according to claim 1, characterized in that the main current circuit comprises a mechanical switch or a combination of a mechanical switch and a power electronic device; the mechanical switch is an electromagnetic repulsion-based high-speed mechanical switch, a high-speed motor-driven mechanical switch or an explosion-driven high-speed mechanical switch.

3. The DC circuit breaker according to claim 1, characterized in that in the current-limiting branch, the inductor (L0), a resistor (R), and a second controllable device (A6) are connected in series; the resistor (R) is one of a carbon film resistor, a metal film resistor, a metal oxidized film resistor, a wire wound resistor, a large power wire wound resistor, an organic solid resistor, a fusing resistor, a cement resistor, a superconducting current-limiting resistor, a liquid-state metal resistor, and a PTC resistor; the second controllable device (A6) is any one of a thyristor or a trigger gap, or any combination thereof.

4. The DC circuit breaker according to claim 1, characterized in that in the breaking branch, the second inductor (L2), a first capacitor (C), and a first controllable device (A5) are connected in series; the first controllable device (A5) is any one of a thyristor, a full-control type semiconductor device, an air trigger gap, and a vacuum trigger gap, or any combination thereof.

5. The DC circuit breaker according to claim 1, characterized in that the first magnetic induction transfer module and the second magnetic induction transfer module are both comprised of an inductive inductance circuit and a discharging capacitance circuit;

the discharging capacitance circuit comprises a first power semiconductor device (A1), a second power semiconductor device (A2), a third power semiconductor device (A3), a fourth power semiconductor device (A4), and a capacitor; the first power semiconductor device (A1) and the fourth power semiconductor device (A4) are connected in series to form a discharging capacitance circuit branch; the second power semiconductor device (A2) is in serial connection with the third power semiconductor device (A3); between the first power semiconductor device (A1) and the fourth power semiconductor device (A4) is provided a first endpoint; between the second power semiconductor device (A2) and the third power semiconductor device (A3) is provided a second endpoint; the capacitor is connected between the first endpoint and the second endpoint;

the inductive inductance circuit comprises inductors (L1, L3);

the discharging capacitance circuit is in parallel connection with the inductive inductance circuit.

6. The DC circuit breaker according to claim 5, characterized in that the first power semiconductor device (A1), the second power semiconductor device (A2), the third power semiconductor device (A3), and the fourth power semiconductor device (A4) are uncontrollable or semi-controlled power semiconductor devices, vacuum trigger gaps, or air trigger gaps, or a combination thereof; the power semiconductor devices include, but not limited to, any one of a power diode, a thyristor, an IGCT, an IGBT, a GTO, or any combination thereof; the inductors are hollow inductors or magnetic core-contained inductors, comprising one inductor or more inductors connected in series or in parallel.

7. The DC circuit breaker according to claim 1, characterized in that the DC circuit breaker according to claim 1, characterized in that the energy dissipation branch comprises one of a varistor or an arrester consisting of a zinc oxide valve block, or a combination thereof.

* * * * *